No. 658,318. Patented Sept. 18, 1900.
B. F. HOWARD.
BROADCAST SEED SOWER.
(Application filed June 16, 1900.)
(No Model.) 2 Sheets—Sheet 1.
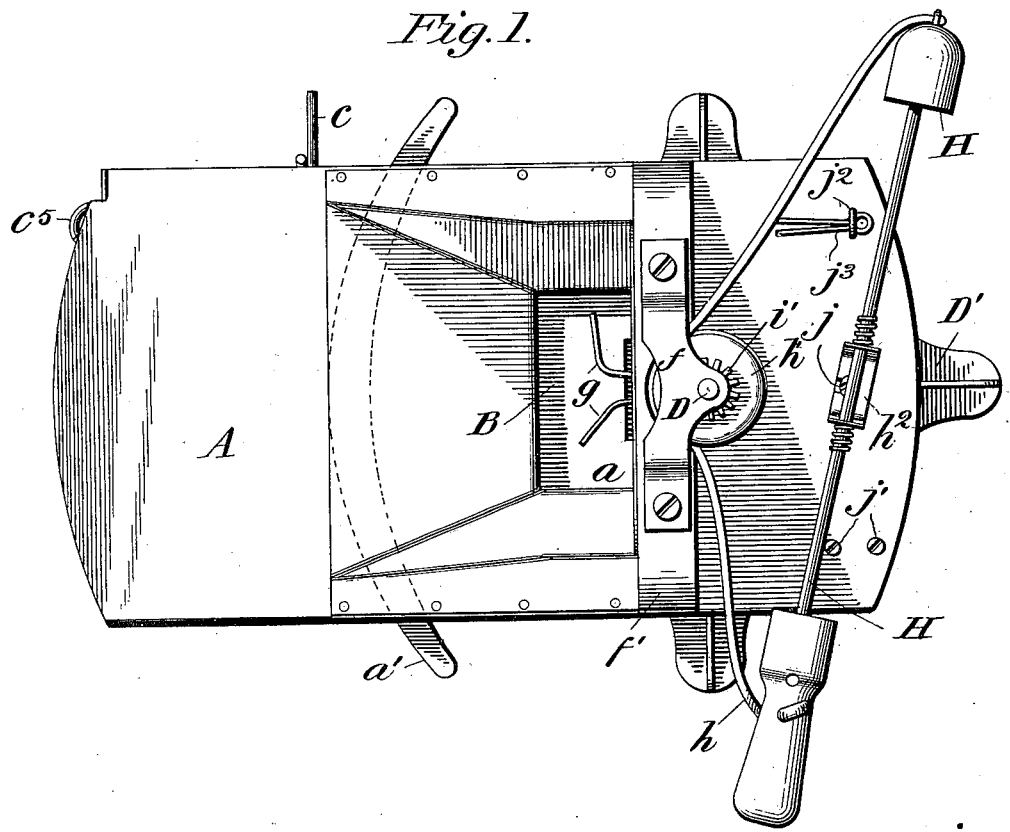
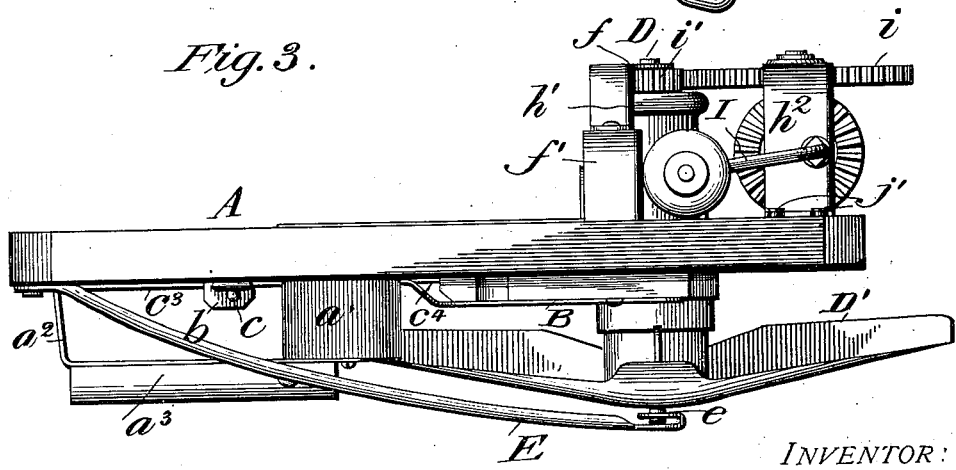
WITNESSES:
L. C. Hills
S. E. Zimmerman
INVENTOR:
Benjamin F. Howard,
BY W. W. Dudley
Attorneys No. 658,318. Patented Sept. 18, 1900.
B. F. HOWARD.
BROADCAST SEED SOWER.
(Application filed June 16, 1900.)

(No Model.) 2 Sheets—Sheet 2.

WITNESSES:
L. C. Hills
S. E. Zimmerman

INVENTOR:
Benjamin F. Howard,
BY W. W. Dudley &Co
Attorneys

UNITED STATES PATENT OFFICE.

BENJAMIN F. HOWARD, OF NORTH MANCHESTER, INDIANA, ASSIGNOR OF ONE-HALF TO JESSE ARNOLD, OF SAME PLACE.

BROADCAST SEED-SOWER.

SPECIFICATION forming part of Letters Patent No. 658,318, dated September 18, 1900.

Application filed June 16, 1900. Serial No. 20,570. (No model.)

*To all whom it may concern:*

Be it known that I, BENJAMIN F. HOWARD, a citizen of the United States, residing at North Manchester, in the county of Wabash and State of Indiana, have invented certain new and useful Improvements in Broadcast Seed-Sowers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to broadcast seed-sowers, and has for its object the production of an improved device of this character possessing advantages in point of simplicity and durability of construction, and added to these the device is capable of being readily adjusted to regulate the distribution of seed and is provided with interchangeable reciprocating and rotary operating means.

The nature of the invention will be readily comprehended, reference being had to the following detail description and to the accompanying drawings, in which—

Figure 2:
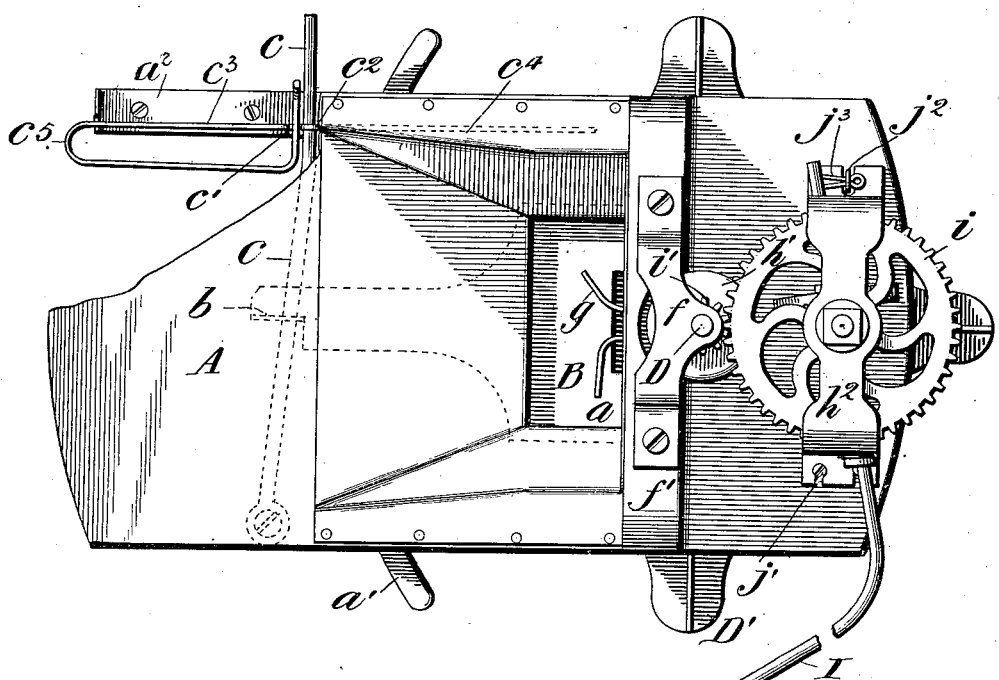
Figure 4:
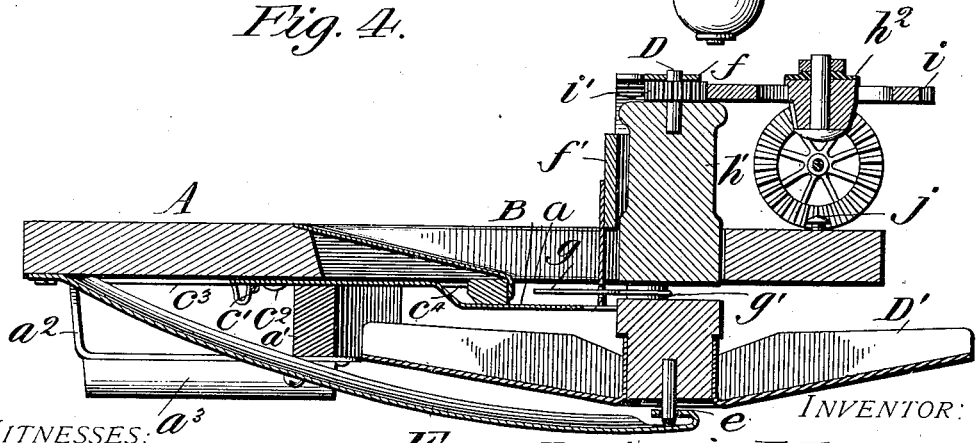

Figure 1 is a top plan view of a broadcast seed-sower embodying my invention. Fig. 2 is a similar view partly broken away and showing a modified form of operating means. Fig. 3 is a side elevation of same. Fig. 4 is a vertical central longitudinal section.

Referring to the said drawings by letter, A denotes the frame provided centrally, or thereabout, with a rectangular seed-opening $a$, having inclined approaches on three sides covered with sheet metal. Below the opening is a plate B, slidably mounted to adjust the size of the opening and regulate the feed of seed. The plate at its rear end is provided with a downturned portion $b$, apertured to receive a transverse arm $c$, which is pivoted at one end and is confined at its other end between shoulders $c'$ $c^2$ on a slide-rod $c^3$. This rod, which is of wire, has one end $c^4$ passed through an aperture in a brace-piece $a'$, forming part of the frame, and its other end $c^5$, after being passed through the handle-attaching strip $a^2$, is bent backward and thence transversely across the rod adjacent to the shoulders, the transverse bend being between the rod and frame, whereby sufficient friction is produced to hold the rod, and consequently the arm $c$ and plate B, in adjusted position. The arm $c$ extends beyond the side of the frame adjacent to the handle $a^3$, whereby it is readily seized and moved to effect the adjustment of the opening $a$.

D denotes the spindle for the distributing-wheel D'. This spindle is journaled at its lower end in the inturned apertured end $e$ of a bracket-arm E, secured to the under side of the frame and to the brace $a'$. This arm is of U shape in cross-section for rigidity, and its outer end affords a support for the spindle, while the inturned portion $e$ serves as the bearing therefor. The upper end of the spindle is journaled in a bracket $f$, secured on the top of a brace-piece $f'$. The inner side of the piece $f'$ forms a continuation of the vertical wall of the opening $a$, and said wall is covered with sheet metal, the wall with the inclined sides constituting a metal-lined hopper for the seed.

As a means for agitating the contents of the hopper, I employ two oscillating arms $g$ $g$, which are preferably formed by bending a single piece of wire to U form and then bending the ends outwardly, as shown. The arms are passed freely through apertures in the plate forming the vertical wall of the hopper and the loop encircles a wrist-pin $g'$, eccentric to the hub of the wheel D'. In the oscillations of the arms $g$ the seed is moved toward the opening $a$, as will be understood.

There is shown in connection with the sower two means for operating the wheel and agitator, one means consisting of a bow H, the cord $h$ of which is passed around a drum $h'$ on the spindle, while the other means is a crank I, connected through gearing $i$ with a pinion $i'$ on the spindle. On the upper side of the frame is a headed screw $j$, located centrally and which serves as the means by which the supporting-bracket $h^2$ for the bow is removably secured. Two headed screws $j'$ $j''$ and a staple $j^2$ and cotter $j^3$ serve as the means by which the bracket supporting the crank and gearing is removably secured. It has been found that for planting such coarse grains as wheat, oats, and barley the best results are obtained by oscillating the wheel through the manipulation of the bow; but for lighter grasses even distribution can be secured better by continuously rotating the wheel. The construction shown and above described permits of either operation.

I claim as my invention—

1. In a broadcast seed-sower, a frame provided with a seed-opening having a vertical wall at one side and inclined approaches at the other sides, metallic plates covering the walls forming a metal-lined hopper, a metallic regulating-plate below the opening having a transversely-apertured extension, a pivoted arm passed through the aperture of the extension, and a slide-rod having shoulders between which the outer end of the arm is confined, said rod being frictionally held in adjusted position.

2. In a broadcast seed-sower, in combination with a frame having a seed-opening, and an adjustable plate below the opening, of an agitator consisting of two outwardly-bent arms and an inner loop encircling a wrist-pin on the distributer-wheel.

3. In a broadcast seed-sower, the combination with a frame, a wheel, and a drum and a pinion on the wheel-spindle, of devices on the frame permitting interchangeable attachment of reciprocating and of rotary operating means to be respectively connected with the drum and with the pinion.

In testimony whereof I affix my signature in presence of two witnesses.

BENJAMIN F. HOWARD.

Witnesses:
THOMSON ARNOLD,
JOHN ISENBARGER.